June 24, 1930.　　M. T. BRODERICK　　1,767,274
CONVERTIBLE LONG AND SHORT SHOPPING BAG
Filed July 5, 1927　　3 Sheets-Sheet 1
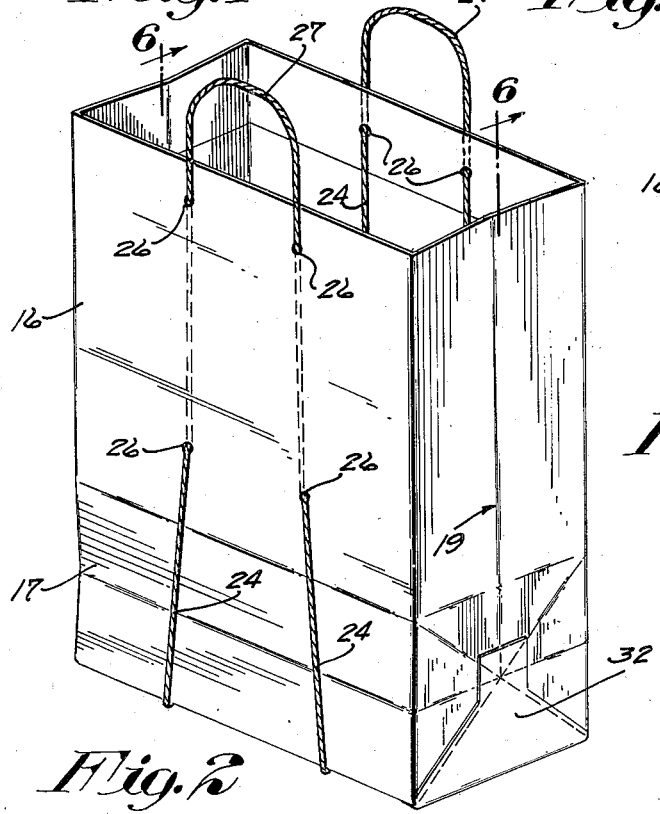
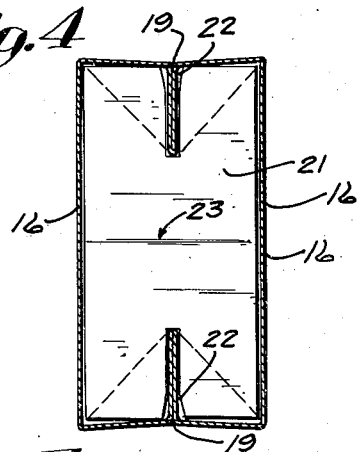
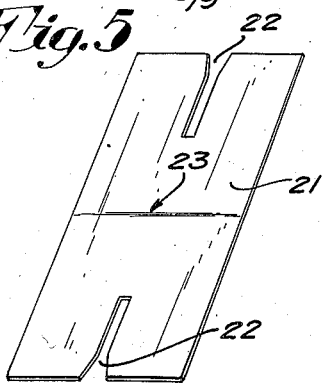
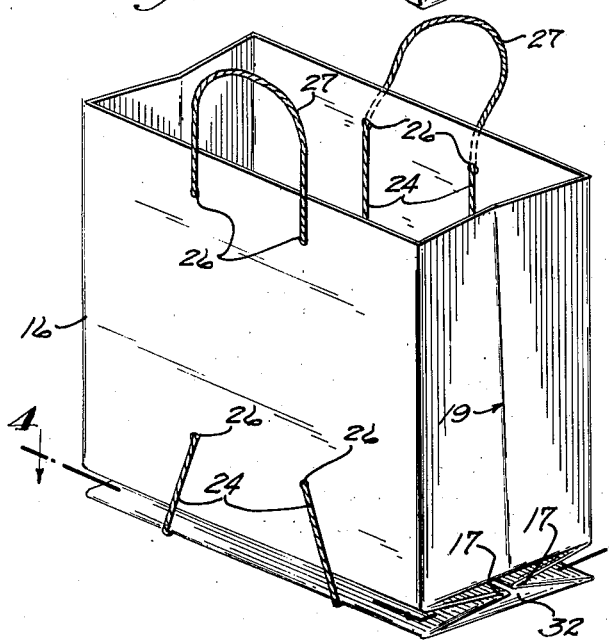
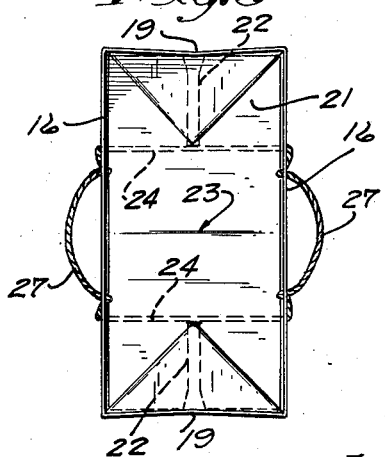
Inventor
Martin T. Broderick
By his Attorneys June 24, 1930. M. T. BRODERICK 1,767,274
CONVERTIBLE LONG AND SHORT SHOPPING BAG
Filed July 5, 1927   3 Sheets-Sheet 2
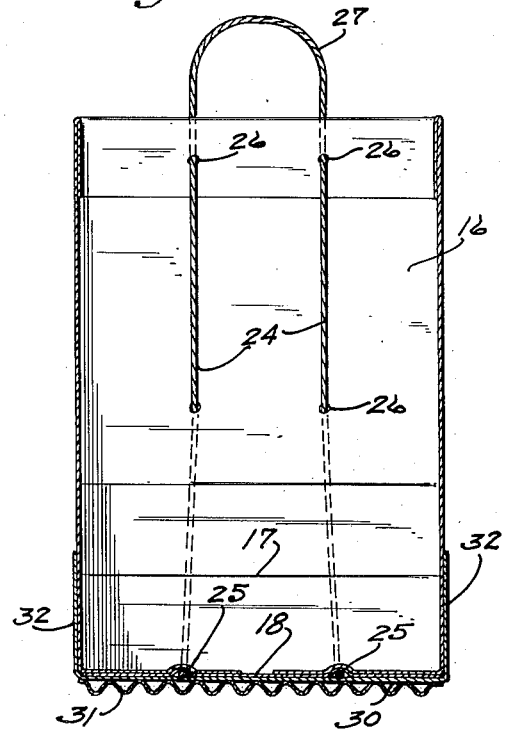
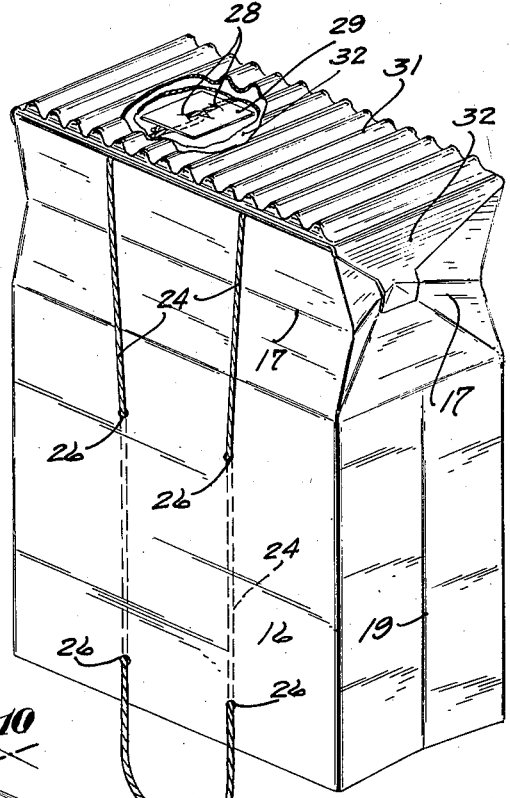
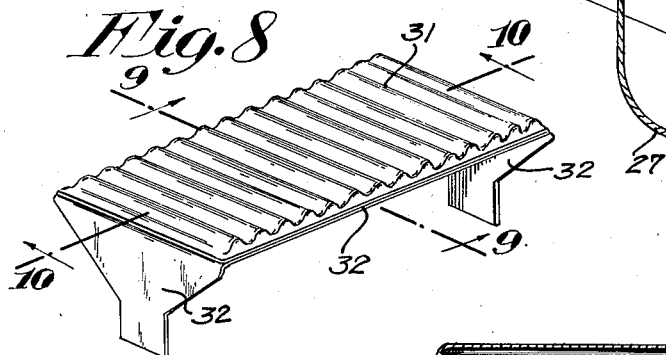
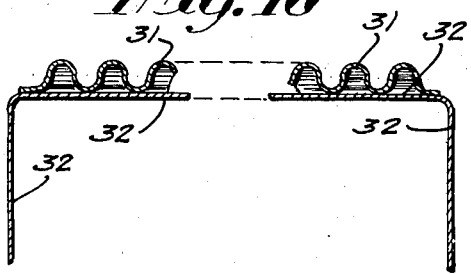
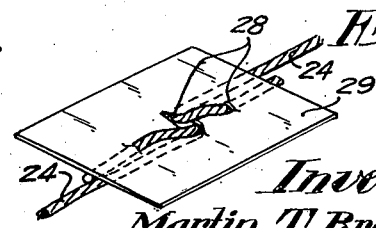
Inventor
Martin T. Broderick
By his Attorneys June 24, 1930. M. T. BRODERICK 1,767,274
CONVERTIBLE LONG AND SHORT SHOPPING BAG
Filed July 5, 1927   3 Sheets-Sheet 3
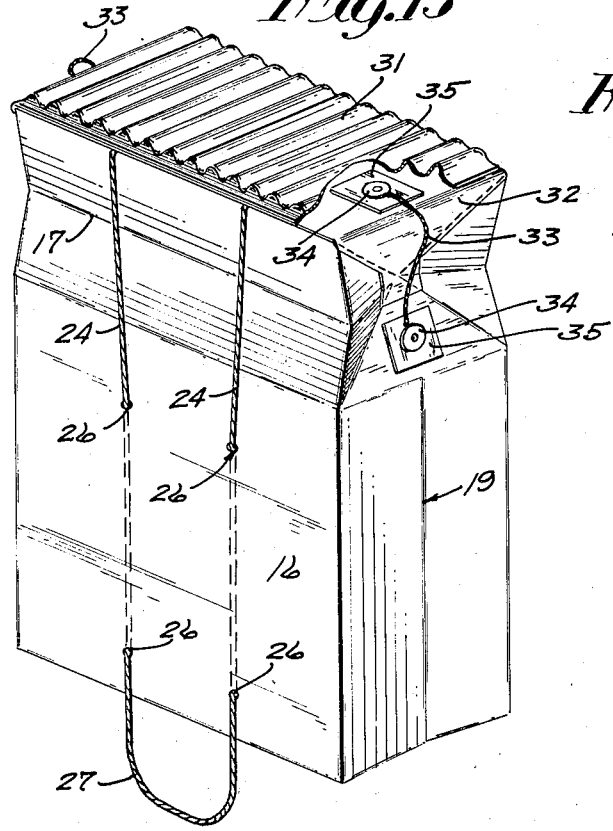
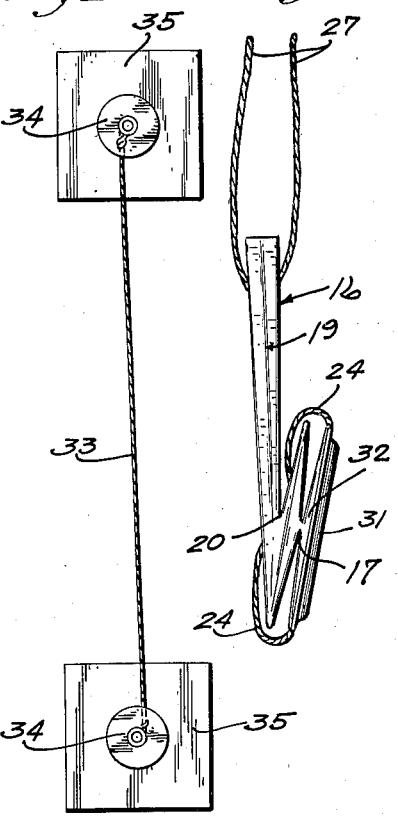
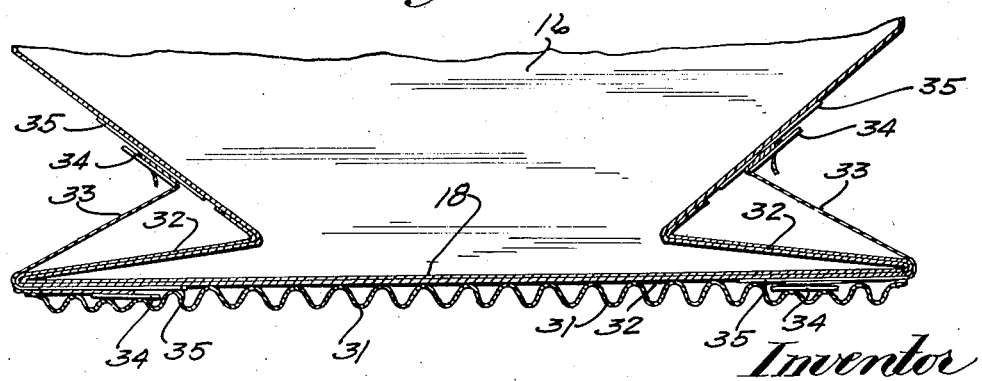
Inventor
Martin T. Broderick
By his Attorney Patented June 24, 1930

1,767,274

UNITED STATES PATENT OFFICE

MARTIN T. BRODERICK, OF MINNEAPOLIS, MINNESOTA

CONVERTIBLE LONG AND SHORT SHOPPING BAG

Application filed July 5, 1927. Serial No. 203,330.

My present invention has for its object the provision of a convertible long and short shopping bag or case that is collapsible and foldable, and to this end it consists of the novel construction and arrangement of parts hereinafter described and defined in the claims.

In the accompanying drawings, which illustrate the invention, like characters indicate like parts throughout the several views.

Referring to the drawings:

Fig. 1 is a perspective view of the bag with its accordion pleat open to form a long bag;

Fig. 2 is a view corresponding to Fig. 1 with the exception that the accordion pleat is folded to form a short bag;

Fig. 3 is a top view of the bag, as shown in Fig. 2;

Fig. 4 is a horizontal section taken on the line 4—4 of Fig. 2;

Fig. 5 is a perspective view of the lock plate;

Fig. 6 is a view in longitudinal vertical section taken on the line 6—6 of Fig. 1;

Fig. 7 is a perspective view of the bag as shown in Fig. 1, turned upside down with some parts broken away and sectioned to illustrate the means for anchoring the ends of the cord;

Fig. 8 is a perspective view of the supplemental bottom removed from the bag and turned upside down;

Fig. 9 is a detail view in section taken on the line 9—9 of Fig. 8, on an enlarged scale;

Fig. 10 is a fragmentary detail view in section taken on the line 10—10 of Fig. 8, on an enlarged scale;

Fig. 11 is a perspective view of the anchor member for the ends of the cord;

Fig. 12 is a side view of the bag partially folded to its smallest dimension;

Fig. 13 is a view corresponding to Fig. 7 but further illustrating fasteners for holding the accordion pleat folded;

Fig. 14 is a fragmentary view principally in section showing the fasteners illustrated in Fig. 13 with the accordion pleat partly folded; and Fig. 15 is a plan view of one of the fasteners.

The improved shopping bag or case is indicated as an entirety by the numeral 16, and when open, is rectangular in cross section. The lower portion of the bag 16 is scored or creased to form folding lines for an accordion pleat 17 adapted, when folded, to form a relatively short bag, see Fig. 2, or when open, a relatively long bag, see Fig. 1. The size of the accordian pleat 17 is such as to fold substantially together, see Fig. 2, to form a secondary bottom overlying the main bottom 18 of the bag 16. Said bag 16, at its two sides, is longitudinally scored or creased at the transverse centers thereof to form folding lines 19. These folding lines 19 are so arranged that the sides of the bag will fold inward upon themselves between the front and back of the bag to permit the same to fold flat. The back of the bag is scored or creased to form a transverse folding line to permit the bottom 18 of the bag and the accordion pleat 17 to be folded flat against the back of the bag, as shown partially folded in Fig. 12.

To hold the accordion pleat 17 folded, there is provided a lock plate 21 having aligned lock notches 22 in its ends. Said lock plate 21 at its longitudinal center, has a folding line 23. The purpose of this folding line 23 is to permit the lock plate 21 to be buckled, inserted into the bag 16 when the accordion pleat 17 is folded, and interlocked with said accordion pleat above the secondary bottom, as shown in Figs. 3 and 4. As best shown in Fig. 4, the notched ends of the lock plate 21 extend between certain of the folds of the accordion pleat 17 and prevent said pleat from being opened.

A cord 24 is folded upon itself and passed under the main bottom 18 of the bag 16 and laid in transverse grooves 25 formed therein by buckling, see Fig. 6. The intermediate portions of the folded cord 24 are loosely threaded through upper and lower pairs of holes 26 in the front and back of the bag 16. The cord 24, above the upper pairs of holes 26, is further looped to form a pair of handles 27, one at the front and the other at the back of the bag. By reference to Fig. 7, it will be noted that the ends of the cord 24 are located in one of the grooves 25 and permanently secured to the main bottom 18 of the bag by being threaded through a plurality of slits 28 in an anchor plate 29 glued or otherwise permanently secured to the main bottom 18. Said cord 24 is free to move longitudinally in the other groove 25.

A secondary bottom is applied under the main bottom 18 and completely covers the same. This secondary bottom comprises a flat sheet 30, glued directly to the bottom 18 and a corrugated sheet 31 glued to the sheet 30. The corrugations in the sheet 31 extend transversely of the main bottom 18 and the ends thereof are closed, as best shown in Fig. 9. Integrally formed with the ends of the sheet 30 are upstanding extensions 32 glued to the accordion pleat 17 at the sides of the bag 16 and cover the apexes thereof, as best shown in Fig. 1.

Fasteners in the form of cords 33 and co-operating pairs of buttons 34, are provided for securing the accordion pleat 17 folded, as illustrated partially folded in Fig. 14. The buttons 34 are anchored to upper and lower reinforcing members 35. The upper reinforcing members 35 are glued to the accordion pleat 17 at the sides of the bag 16 and the lower reinforcing members 35 are glued to the lower face of the main bottom 18 under the secondary bottom 30—31. The length of the cords 33 is such as to permit the accordion pleat 17 to open, as shown in Fig. 13, and by winding these cords 33 around the upper buttons 34 the operative length of said cords may be shortened and thereby secure and hold the accordion pleat 17 folded. These fasteners 33—34 may be used in connection with the lock plate 21 or independent thereof.

As the cord 24 is loose in the holes 26 and in one of the grooves 25 the same may be shortened by tying a knot in one section thereof, to adjust the handles 27 when the accordion pleat 17 is folded to form a short bag in order to keep said handles in substantially the same relation to the top of the bag as when the accordion pleat 17 is opened to form a long bag, as shown in Fig. 1. When the bag 16 is collapsed and folded at 20, as shown in Fig. 12, the same is reduced to its smallest dimension so that it may be packed, stored or shipped in compact form.

To open the bag 16, it will be only necessary to take the same by its handles 27, at which time the bottom 18 will automatically fall into position and by slightly drawing the handles 27 apart, the short bag will be open to its square form. If it is desirable to convert the bag 16 into a long bag, it is only necessary to remove the lock plate 21 or unwind the cords 33 from the buttons 34, or both. After the accordion pleat 17 is thus released, the accordion pleat 17 may be opened up by giving the bag a shake.

The secondary bottom 30—31 protects the main bottom 18 of the bag 18 from wear, water and moisture. The air spaces in the corrugated sheet 31 fully protect the bottom of the bag and keep the same dry. The corrugated plate 31 also affords a wearing surface for the bag 16. The extensions 32 of the secondary bottom reinforce the accordion pleat 17 at the sides of the bag 16 by covering the apexes thereof where the opening and closing movements of said pleat will be liable to break. The lock plate 21 protects the secondary bottom and assists in carrying part of the load in the bag 16. By extending the cord 24 transversely under the bag and leaving the same loose in the pair of holes 26, the weight of the contents in the bag 16, whether on the secondary bottom or the main bottom 18, is carried by said cords and thereby relieves the bag from load-carrying strains. It will be noted by reference to Figs. 1 and 2 that the cords between the lower pairs of holes 26 and the bottom 18 of the bag are in diverging relation so as to support said bottom near the side of the bag and thereby more evenly carry the load.

From the above description it is evident that the folded short bag may be very quickly and easily opened and its size and shape makes it very easy to load. In case the load to be carried is greater than the capacity of the short bag, it is an extremely easy matter to remove the lock plate 21 or release the cords 33 or both, to convert the short bag into a long bag. The weight of the bottom 18 will tend to open the accordion pleat 17 and the very act of loading the long bag will completely open the pleat 17.

As is obvious, the bottom reinforcement exemplified by the reinforcing structure best illustrated in Fig. 8 may be applied generally to carrying bags and is not limited to its application to any particular type of bag.

What I claim is:

1. A bag having an accordion pleat adapted, when folded, to form a short bag and, when straightened out, to form a long bag, a supplemental bottom applied to the main bottom of the bag and having extensions overlapping the sides of the bag and reinforcing the accordion pleat.

2. A bag having an accordion pleat extending transversely therearound and adapted, when folded, to form a short bag and, when straightened out, to form a long bag, and a cord looped to form a pair of handles above the top of the bag, loosely threaded through upper and lower pairs of holes in the front and back of the bag, extended under the bottom of the bag and supporting the same, said cord being adjustable through said holes for either a short or a long bag.

3. A bag having an accordion pleat extending transversely therearound and adapted when folded to form a short bag and when straightened out to form a long bag, and a pair of handles attached to the bottom of the bag and adjustable for either of the short or long bag.

4. A bag having an accordion pleat adapted, when folded, to collapse the lower end portion of the bag and to form a short bag and, when straightened out, to form a long bag, the accordion pleat being of such size as to fold substantially together to form a secondary bottom overlying the main bottom of the bag, said bag having a folding line on its back arranged to cause said main bottom to fold onto the back of the bag when the accordion pleat is folded.

5. A bag having an accordion pleat adapted, when folded, to collapse the lower end portion of the bag and to form a short bag and, when straightened out, to form a long bag, and a lock plate adapted to be inserted into the bag and interlocked with the accordion pleat to hold the same folded.

6. A bag having an accordion pleat adapted, when folded, to collapse the lower end portion of the bag and to form a short bag and, when straightened out, to form a long bag, and a lock plate having lock notches in its ends and adapted to be buckled, inserted into the bag and then straightened to cause its notched ends to interlock with the accordion pleats and hold the same folded.

7. A bag having an accordion pleat adapted, when folded, to collapse the lower end portion of the bag and to form a short bag and, when straightened out, to form a long bag, the sides of the bag, above the accordion pleat, having folding lines to permit said sides to fold upon themselves between the front and back of the bag when the bag is folded, said accordion pleat being arranged to permit the bottom of the bag to fold against one side of the bag and substantially thereto.

8. A bag having an accordion pleat adapted, when folded, to collapse the lower end portion of the bag and to form a short bag and, when straightened out, to form a long bag, and fasteners for holding the accordion pleat folded when forming the short bag.

9. A bag having an accordion pleat adapted, when folded, to collapse the lower end portion of the bag and to form a short bag and, when straightened out, to form a long bag, and reinforcing members applied to the accordion pleats at the sides of the bag and covering the apexes thereof.

10. A bag having an accordion pleat adapted, when folded, to collapse the lower end portion of the bag and to form a short bag and, when straightened out, to form a long bag, and a lock plate having lock notches in its ends and adapted to be buckled, inserted into the bag and then straightened to cause its notched ends to interlock with the accordion pleats and hold the same folded, said lock pleat being of substantially the same size as the main bottom of the bag.

In testimony whereof I affix my signature.

MARTIN T. BRODERICK.